(12) United States Patent
Woollenweber et al.

(10) Patent No.: US 8,845,271 B2
(45) Date of Patent: Sep. 30, 2014

(54) TURBOCHARGER BEARING SYSTEM

(76) Inventors: William E. Woollenweber, Carlsbad, CA (US); Joseph S. Delgado, Downey, CA (US)

(*) Notice: Subject to any disclaimer, the term of this patent is extended or adjusted under 35 U.S.C. 154(b) by 585 days.

(21) Appl. No.: 13/134,118

(22) Filed: May 31, 2011

(65) Prior Publication Data
US 2012/0308365 A1 Dec. 6, 2012

(51) Int. Cl.
- *F01D 25/16* (2006.01)
- *F02C 6/12* (2006.01)
- *F01D 25/18* (2006.01)

(52) U.S. Cl.
CPC . *F01D 25/16* (2013.01); *F02C 6/12* (2013.01); *F01D 25/18* (2013.01); *Y10S 384/901* (2013.01)
USPC ........... 415/107; 415/111; 415/229; 416/174; 407/407; 384/901; 384/277

(58) Field of Classification Search
USPC ............ 415/110, 111, 112, 170.1, 229, 104, 415/105, 107, 174; 384/901, 277; 417/407; 416/174
See application file for complete search history.

(56) References Cited

U.S. PATENT DOCUMENTS

| | | | | |
|---|---|---|---|---|
| 2,324,095 A | * | 7/1943 | Lieberherr | 384/426 |
| 3,043,636 A | * | 7/1962 | Macinnes et al. | 384/287 |
| 3,056,634 A | * | 10/1962 | Woollenweber, Jr. et al. | 384/287 |
| 3,096,126 A | * | 7/1963 | Woollenweber, Jr. et al. | 384/114 |
| 3,390,926 A | * | 7/1968 | Woollenweber, Jr. | 384/287 |
| 3,494,679 A | * | 2/1970 | Burdette | 384/139 |
| 3,941,437 A | * | 3/1976 | MacInnes et al. | 384/287 |
| 3,993,370 A | * | 11/1976 | Woollenweber | 384/287 |
| 4,025,134 A | * | 5/1977 | Reisacher | 384/120 |
| 4,095,857 A | * | 6/1978 | Palmer | 384/368 |
| 4,157,834 A | * | 6/1979 | Burdette | 277/306 |
| 4,171,137 A | * | 10/1979 | Aizu et al. | 277/429 |
| 4,240,678 A | * | 12/1980 | Sarle et al. | 384/369 |
| 4,355,850 A | * | 10/1982 | Okano | 384/121 |
| 4,420,160 A | * | 12/1983 | Laham | 277/306 |
| 4,641,977 A | * | 2/1987 | Woollenweber | 384/99 |
| 4,704,075 A | * | 11/1987 | Johnston et al. | 417/407 |
| 4,725,206 A | * | 2/1988 | Glaser et al. | 417/407 |
| 4,786,238 A | * | 11/1988 | Glaser et al. | 417/53 |
| 5,169,242 A | * | 12/1992 | Blase et al. | 384/99 |
| 5,857,332 A | * | 1/1999 | Johnston et al. | 60/607 |
| 5,993,173 A | * | 11/1999 | Koike et al. | 417/407 |
| 6,017,184 A | * | 1/2000 | Aguilar et al. | 415/112 |
| 6,126,414 A | * | 10/2000 | Koike | 417/407 |
| 6,364,634 B1 | * | 4/2002 | Svihla et al. | 417/409 |
| 6,418,722 B1 | * | 7/2002 | Arnold | 60/605.1 |
| 6,709,160 B1 | * | 3/2004 | Ward et al. | 384/286 |

(Continued)

FOREIGN PATENT DOCUMENTS

JP 63092817 A * 4/1988 ............. F16C 33/10

*Primary Examiner* — Edward Look
*Assistant Examiner* — Wayne A Lambert
(74) *Attorney, Agent, or Firm* — Donn K. Harms

(57) ABSTRACT

A bearing system for a turbocharger shaft comprising a rotatable elongated cylinder with axially spaced journal bearing surfaces on the inside diameter and a thrust face on each end. A sleeve on the shaft incorporates a flange on one end that transmits thrust force to one thrust face on the elongated cylinder. A flanged collar on the opposite end of the shaft transmits thrust force to the thrust face on the opposite end of the elongated cylinder. A radially extending flange on one end of the elongated cylinder transmits thrust forces to stationary housings.

17 Claims, 3 Drawing Sheets

(56) References Cited

U.S. PATENT DOCUMENTS

| | | | |
|---|---|---|---|
| 6,905,316 B2 * | 6/2005 | Parker et al. | 417/407 |
| 7,344,362 B2 * | 3/2008 | Kopp et al. | 417/407 |
| 7,614,853 B2 * | 11/2009 | Saville | 416/244 A |
| 2002/0044875 A1 * | 4/2002 | Parker et al. | 417/407 |
| 2008/0232729 A1 * | 9/2008 | Petitjean et al. | 384/284 |
| 2010/0037855 A1 * | 2/2010 | French | 123/323 |
| 2010/0129212 A1 * | 5/2010 | Berger et al. | 415/229 |
| 2011/0176907 A1 * | 7/2011 | Groves et al. | 415/1 |

* cited by examiner

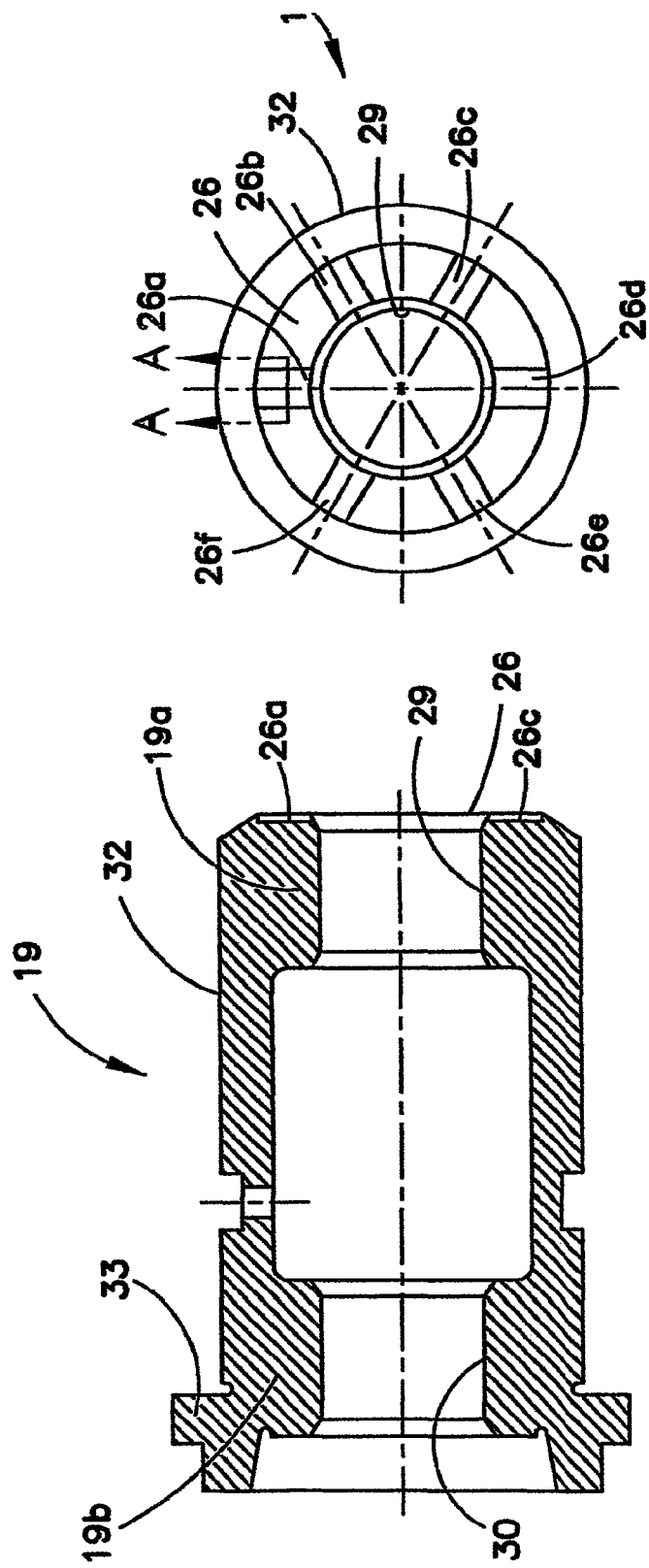

SECTION A-A

TURBOCHARGER BEARING SYSTEM

FIELD OF THE INVENTION

This invention relates to bearing systems for turbochargers used on internal combustion engines that have rotor assemblies that rotate at very high speed and have shafts that are exposed at one end to very high temperatures.

BACKGROUND OF THE INVENTION

Nearly all vehicular diesel engines have used turbochargers for many years and, more recently, are becoming more prevalent on gasoline engines due to their ability to improve fuel consumption. The more stringent miles-per-gallon regulations imposed by the federal government standards will be the motivation for more vehicle engines to be turbocharged.

Small turbochargers have become a viable commercial product, primarily due to the development of satisfactory bearing systems that have allowed them to operate successfully at very high rotational speeds. A very great amount of time and effort has been expended over the years to develop bearing systems that damp destructive shaft vibrations, insulate the rotor from external shock loads, and withstand the heat transferred into the shaft from the hot turbine wheels that are exposed to engine exhaust gas.

The most prevalent of these successful bearing systems utilize floating sleeve bearings to support the shaft and have an inner and outer oil film where the outer oil film provides a damping cushion that permits the turbocharger rotor to pass through its critical speed without destroying the bearing system. The floating sleeve bearings also permit the rotor to find and rotate about its mass center, thereby eliminating radial forces that would be imposed on the bearings if the rotor were constrained to rotate about its geometric center.

Dynamic balancing of the rotor components and the rotor assembly results in making the mass center and geometric centers coincidental, however, there is almost always a small difference left between these centers in practice, and that causes an orbital motion of the rotor. This orbital motion is permitted to occur within the oil film thicknesses of the floating sleeve bearings and contributes to the long-term durability of the floating sleeve bearing systems.

The early floating sleeve journal bearing systems required a separate thrust bearing, capable of carrying the axial thrust forces generated in turbocharger operation that can occur in both axial directions. Since the friction loss in radial thrust bearings that are perpendicular to the shaft axis is proportional to the fourth power of the radius, any collar attached to the shaft that bears axially against the stationary thrust bearing surface will generate a relatively high friction loss. Accordingly, the radius of the thrust bearing should be kept as small as possible in designing a complete turbocharger bearing system.

An early attempt to minimize thrust bearing losses is illustrated in U.S. Pat. No. 3,390,926, dated Jul. 2, 1968, where a large shoulder on the turbine wheel hub bore against the end of a tubular one piece bearing, the other end of which was forced against a stationary plate to carry thrust in one axial direction. The tubular bearing was rotatably carried on a film of oil in the stationary bearing housing and had two axially spaced journal bearing surfaces on its inside diameter. When rotor conditions caused thrust in the opposite direction, a collar attached to the shaft was forced against the said stationary plate to carry the thrust load.

This bearing system worked satisfactorily as long as exhaust gas temperatures were moderate. However, when exhaust gas temperatures became high as with highly rated engines, the heat carried from the turbine wheel to the hub that bore against the end of the tubular bearing could cause distress on the bearing surface.

Sleeve bearing systems are particularly desirable in turbochargers which employ wide usage because they are less expensive to manufacture and can be easily assembled. However, there is a need for improved sleeve bearing systems which are more efficient and reliable when operating at very high speeds in the presence of very high temperatures, such as those experienced by turbochargers for highly rated internal combustion engines.

SUMMARY OF THE INVENTION

This invention provides an improvement on previously known turbocharger sleeve bearing systems for very high speed rotating shafts operating in the presence of very high temperatures. The invention includes a one-piece sleeve bearing element that contains both journal and thrust bearing surfaces and where the rotating turbocharger shaft transmits thrust forces to the thrust bearing surfaces on the one-piece sleeve bearing ends by radially extending flanges that are cooled by bearing lubricant. The invention can further include a sleeve bearing system where a radially extending bearing surface at the hot turbine end of the turbocharger shaft is provided by a separate collar which minimally interfaces with the turbocharger shaft and the adjacent thrust bearing surface of the one-piece sleeve bearing to both reduce heat transfer from the hot turbine end of the turbocharger to the remainder of the bearing system and to reduce thrust bearing losses. The lubrication and cooling of the thrust bearing at the turbine end of the turbocharger can be enhanced by one or more lubricant passageways formed in at least one of its adjacent thrust bearing surfaces. In addition, the one-piece sleeve bearing element provides rotatable thrust bearing surfaces that reduce the relative speed differential between the adjacent thrust bearing surfaces of the rotating shaft and the one-piece sleeve bearing element.

Other features and advantages of the invention will be apparent from the more detailed description and claims that follow and from the drawings.

BRIEF DESCRIPTION OF THE DRAWING

FIG. 2 is a cross-sectional view of the one-piece combination journal and thrust bearing taken at a plane through its central axis.

FIG. 3 is a view of the end of the combination one-piece journal and thrust bearing shown in FIG. 2.

BEST MODE FOR CARRYING OUT THIS INVENTION

Figure 1:
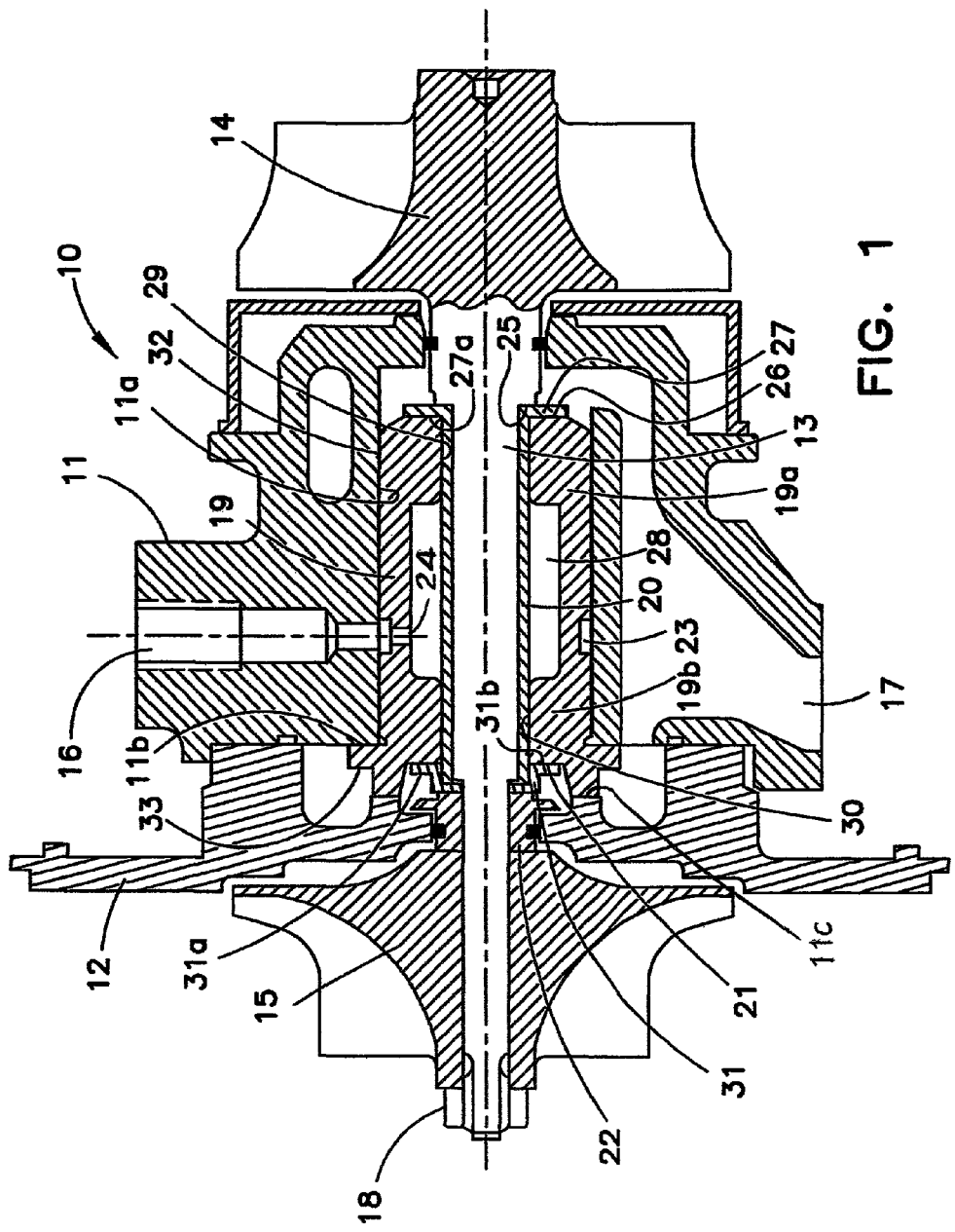
FIG. 1 is a cross-sectional view of a turbocharger, without its exhaust gas volute and compressor casing, showing a one-piece combination journal and thrust bearing in accordance with this invention.

The bearing system of this invention is adapted to support, within stationary elements of a turbocharger, a high-speed rotating shaft that is subject to heat conduction on one end axially from a hot turbine wheel. FIG. 1, for example, illustrates the components of a turbocharger 10, comprising a bearing housing 11, a seal plate 12 enclosing a rotating shaft 13 carrying a turbine wheel 14 at one end and a compressor wheel 15 at the other end. A combination one-piece journal and thrust bearing 19 of this invention carries the rotating shaft 13 and is rotatably carried in the bearing housing 11. The turbine wheel 14 is driven by exhaust gas from an internal combustion engine exhaust manifold; consequently, the turbocharger shaft 13 must withstand high temperatures conducted into it from the hot turbine wheel 14.

Where, in this application, we use the term "outer", it means in the direction of the bearing housing 11, and where we use the term "inner", it means in the direction of the turbocharger shaft.

Figure 4:
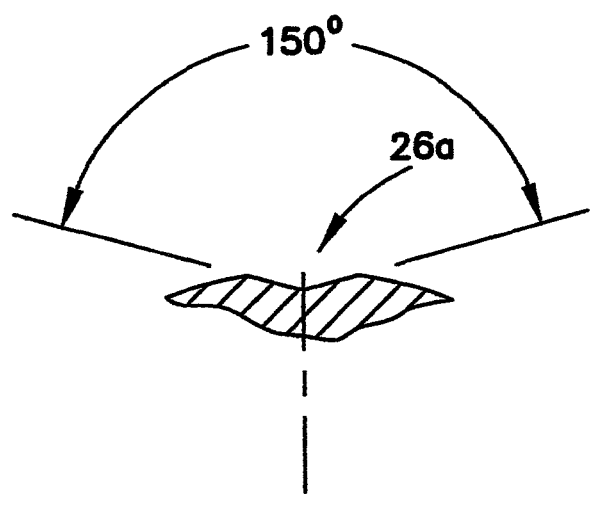
FIG. 4 illustrates the cross section, taken at A-A of FIG. 3, of one of the lubricant grooves in the end of the one-piece journal and thrust bearing shown in FIG. 3.

FIGS. 2-4 illustrate the combination bearing 19 which includes an outer cylindrical bearing surface 32, which is rotatably carried in the inner cylindrical surface 11a of the bearing housing 11. The combination bearing 19 comprises an elongated cylinder rotatably mounted in bearing housing 11 with two inwardly projecting portions 19a and 19b providing two axially spaced journal bearing surfaces 29 and 30 on its inside diameter. The two axially spaced inwardly projecting portions 19a and 19b form, with a separate turbocharger shaft sleeve portion 20, an oil reservoir 28 interposed there between. A flange 33 extends radially from the compressor end of the outer bearing element 19 and transmits thrust loads to seal plate 12 and bearing housing 11. The outside surface 32 of combination bearing element 19 is fed lubricating oil from oil inlet 16 and the oil flows axially in both directions over the entire outer bearing surface 32 of combination bearing element 19 and between the thrust bearing surface 11b of the bearing housing 11, exiting into the oil drain area 17. As can be discerned in the drawings, oil from oil inlet 16 also flows inward through the lubricant Passageway 24, into the oil reservoir 28 from which it flows axially in both directions through bearing clearances 29 and 30. From bearing clearance 30, the lube oil flows outwardly over thrust bearing surface 11c and enters the oil drain area 17. From bearing clearance 29, the lube oil flows outwardly over thrust bearing surface 26, entering the oil drain area 17. Circumferential groove 23 in the outer cylindrical bearing surface provides a continuous supply of lube oil from oil inlet 16 through lubricant passageway 24 into the oil reservoir 28 as the combination bearing element 19 rotates during operation. The diametrical clearance between the outside cylindrical bearing surface 32 of combination bearing element 19 and the inner cylindrical surface 11a of the bearing housing 11 is of the order of 0.003" to 0.005" and cushions the turbocharger rotating assembly against shock and vibration. In addition, the combination bearing element 19 comprises a pair of thrust bearing surfaces, one 26 on the outer side of the inwardly projecting portion 19a at the turbine end of the combination bearing element 19, and the other 21 on an inwardly projecting portion 19b at the compressor end of the combination bearing element 19. The combination bearing element 19 is a unique construction comprising both thrust bearing surfaces 26 and 21, and axially spaced journal bearings 29 and 30 in one member and rotates in the bearing housing bore 11a at a fraction of the speed of the turbocharger shaft 13. This reduces the relative speed between the shaft 13 and all bearing surfaces and contributes to minimizing both journal and thrust bearing losses.

To reduce the heat transfer from the hot turbocharger shaft 13 through the shaft shoulder 25 into the turbine end thrust bearing surface 26 of the outer bearing element 19, a thrust flange 27, located at the turbine end of a cylindrical shaft sleeve 20, is interposed between shaft shoulder 25 and thrust bearing surface 26. The shaft shoulder 25 is shallow in depth with a minimal cross-sectional area that serves to minimize heat flow into the thrust flange 27. For example, the shoulder 25 can extend outwardly less than about ⅛ inch from the cylindrical outer surface of the turbocharger shaft, significantly less than about 40% of the outward extent of flange 27. This feature of this invention serves to protect the thrust bearing surface 26 of outer bearing element 19 and the thrust bearing surface 27a of thrust flange 27 from deterioration when carrying high thrust loads imposed by the rotating turbocharger shaft 13. The thrust bearing surfaces 26 and 27a are also cooled by lubricating oil coming from the oil reservoir 28, through the turbine end journal bearing 29, and flowing radially outward between the thrust bearing surfaces 26 and 27a and on into the oil drain area 17. As illustrated in FIGS. 3 and 4, the outer side thrust bearing surface 26 of the outer bearing element 19 adjacent thrust flange 27 can be provided with one or more lubricant passageways, preferably with a plurality of space lubricant passageways. In a preferred provision of lubricant passageways 26a-26f, the plurality of lubricant passageways are formed by grooves uniformly angularly spaced around the outer side thrust bearing surface 26 and extending radially outwardly from the inner cylindrical bearing surface 29. As illustrated by 26a in FIG. 4, the plurality of grooved lubricant passageways 26a-26f can preferably have a shallow V-shaped cross section. For example, the lubricant passageways can be formed by side surfaces that intersect with an included angle of 150 degrees at a depth of about 0.012 inches.

Shaft sleeve 20 rotates with the turbocharger shaft 13 and is securely held in place by compression exerted by lock nut 18 through compressor wheel 15, flinger sleeve 22 and end cap 31. End cap 31 includes a radially extending flange portion 31a with a thrust bearing inner surface 31b and carries axial rotor thrust in the direction toward thrust flange 27. This thrust face is lubricated by oil coming from oil reservoir 28 through the compressor end journal bearing 30 and flowing radially outward between thrust bearing surfaces 31b and 21 into the oil drain area 17.

If the shaft sleeve 20 were not employed, the hub diameter of the shaft would need to be increased to the size of the thrust flange 27. This would greatly increase the heat transfer from the hot turbine wheel 14 into the thrust flange 27, leading to a deterioration of the thrust surface that could cause eventual failure.

As shown by the description and drawings, the invention provides a bearing system for rotationally carrying a turbocharger shaft 13 for rotation at very high speeds in the presence of very high exhaust gas temperatures. Such a preferred bearing system can be inserted into and carried by a turbocharger bearing housing 11 including a cylindrical bearing surface 11a, and includes a combination outer bearing element 19 having an outer cylindrical bearing surface 32 adapted to be rotatably carried within the cylindrical bearing surface 11a of the turbocharger bearing housing 11 and further having two spaced inwardly projecting portions 19a, 19b, each inwardly projection portion 19a, 19b of the outer bearing element 19 having an inner cylindrical journal bearing surface 29, 30 for carrying a cylindrical turbocharger shaft portion 20 and an outer side thrust bearing surface 26, 21, said two spaced inwardly projecting portions 19a, 19b forming with the turbocharger shaft portion 20 a centrally located lubricant reservoir 28. The turbocharger shaft 13 of such a preferred bearing system can be provided with thrust bearing surfaces 27a, 31b adjacent each outer side thrust bearing surface 26, 21 of the inwardly projecting portions 19a, 19b of the outer bearing element 19 and can be adapted to transfer thrust from the turbocharger shaft 13 to the outer bearing element 19 in the two opposing axial directions of the turbocharger shaft 13. In such a preferred bearing system 10, the turbocharger bearing housing 11, outer bearing element 19 and turbocharger shaft portion 20 can be adapted to provide a flow of lubricant from outside the turbocharger bearing housing 11 to between the inner cylindrical bearing surface 11a of the turbocharger bearing housing 11 and the outer cylindrical bearing surface 32 of the outer bearing element 19, through the centrally located lubricant reservoir 28, and outwardly between the bearing surfaces of the combination bearing element 19, that is, the inner cylindrical journal bearing surfaces 29, 30 and the outer side thrust bearing surfaces 26, 21 of the inwardly projecting portions 19a, 19b of the outer bearing element 19, and the cylindrical turbocharger shaft portions 20 and thrust bearing surfaces 27a, 31b of the turbocharger shaft 13 adjacent each outer side thrust bearing surface 26, 21 of the outer bearing element 19 to reliably carry the rotating turbocharger shaft 13 and transfer thrust from the rotating turbocharger shaft 13 to the outer bearing element 19 in both axial directions of the turbocharger shaft 13. Furthermore, the turbocharger shaft 13 can include a shallow shoulder 25 adjacent its turbine end and the thrust flange 27 and its thrust bearing surface 27a at the turbine end of the turbocharger shaft 13 to reduce heat transfer from the turbine 14 of the turbocharger into the bearing system. Furthermore, the outer side thrust bearing surface 26 of the inwardly projecting portion 19a of the outer bearing element 19 at the turbine end of the turbocharger shaft 13 can include a plurality of grooves forming spaced lubricant passageways in the turbine end thrust bearing. (See, for example, grooves 26a-26f.) Preferably, the plurality of grooved lubricant passageways are shallow in depth and extend radially outwardly from the inner cylindrical journal bearing surface 29 and are uniformly spaced around the outer side thrust bearing surface 26.

The illustrated bearing system of this invention comprises a reliable floating elongated cylindrical outer bearing element forming axially spaced journal bearing surfaces and thrust bearing surfaces on both ends. The rotating combination bearing is easily inserted and removed from the bearing housing and acts like a floating sleeve bearing that protects the rotor assembly of the turbocharger from shock and vibration. In addition, the oil film on the outside diameter of the combination bearing allows the rotating assembly of the turbocharger to find and rotate about its center of mass without transmitting excessive radial loads to the stationary housing parts.

The bearing system of this invention further embodies combination thrust and journal bearings, wherein the turbocharger shaft has a separate flange forming a thrust collar on one end that has minimal contact with a small shoulder on the turbine wheel hub, thus minimizing the heat that is conducted from the hot turbine wheel into the bearings. Since the flange on the sleeve is cooled by a flow of lubricating oil, it is capable of functioning as a thrust-carrying surface satisfactorily even when exhaust temperatures are high.

The combination thrust and journal bearing of the present invention rotates in the bearing housing at a fraction of the speed of the shaft. This reduces the speed differential between the two members and minimizes the thrust and journal bearing friction losses.

While this foregoing description describes a preferred embodiment of the invention, other embodiments may be devised without departing from the spirit or scope of the following claims:

What is claimed is:

1. A bearing system for carrying a turbocharger shaft for rotation at very high speeds in the presence of very high turbocharger exhaust gas temperatures, comprising an outer bearing element with a cylindrical outer surface adapted to be rotationally carried on lubricant film by a turbocharger bearing housing and an inner surface comprising two axially spaced inwardly-projecting portions, each inwardly projection portion having an inner cylindrical journal-bearing surface for carrying a turbocharger shaft and each having an outer side thrust bearing surface positioned in-between said cylindrical outer surface and said journal-bearing surface and adapted to be engaged by a rotating thrust bearing surface carried by the turbocharger shaft, said two axially spaced inwardly projecting portions of the outer bearing element forming, with the turbocharger shaft, a lubricant reservoir whereby lubricant contained within the lubricant reservoir flows outwardly between the turbocharger shaft and the inner cylindrical journal bearing surfaces of the inwardly projecting portions of the outer bearing element, and outwardly between the outer side thrust bearing surfaces of the inwardly projecting portions of the outer bearing element and rotating thrust bearing surfaces carried by the turbocharger shaft for lubrication of their adjacent surfaces, said outer bearing element further comprising an outwardly extending flange having two opposed surfaces adapted to engage stationary surfaces of the turbocharger and provide thrust bearing surfaces to carry thrust forces of the turbocharger shaft through a film of lubricant to the stationary surfaces of the turbocharger.

2. The bearing system of claim 1 further comprising an elongated cylindrical sleeve surrounding the turbocharger shaft and having an outwardly projecting flange at its turbine end, said sleeve being held to rotate with the turbocharger shaft between a shallow turbocharger shaft shoulder adjacent the turbine end of the turbocharger shaft and an end cap adjacent the compressor end of the turbocharger shaft having an outwardly projecting compressor end flange, said outwardly projecting turbine end flange adapted for transfer of compressor-directed thrust of the turbocharger shaft through a lubricant film to the outer side thrust-bearing surface of the inwardly extending portion of the outer bearing element adjacent the turbine end of the turbocharger, and the outwardly projecting compressor end flange being adapted for transfer of turbine-directed thrust of the turbocharger shaft through a lubricant film to the outer side thrust-bearing surface of the inwardly projecting portion of the outer bearing element adjacent the compressor end of the turbocharger.

3. The bearing system of claim 2 wherein the shallow turbocharger shaft shoulder has an outwardly projecting shoulder surface which extends only a fraction of the outward extent of the outwardly projecting flange of the elongated cylindrical sleeve.

4. The bearing system of claim 3 wherein the outwardly projecting shoulder surface of the shallow turbocharger shaft shoulder extends less than half of the outward extent of the outwardly projecting flange of the elongated cylindrical sleeve.

5. The bearing system of claim 1 wherein the outer bearing element includes a lubricant passageway between its cylindrical outer surface and the lubricant reservoir between the inwardly projecting portions of its inside surface.

6. The bearing system of claim 1 wherein the outer side thrust bearing surface of the inwardly projecting portion of the outer bearing element at its turbine end includes a plurality of spaced lubricant passageways around its outer side thrust bearing surface.

7. The bearing system of claim 6 wherein the plurality of spaced lubricant passageways extend radially from the inner cylindrical journal bearing surface of the inwardly projecting portion of the outer bearing element.

8. The bearing system of claim 6 wherein the lubricant passageways are formed by grooves having a shallow V-shaped cross section.

9. A turbocharger bearing system for carrying a turbocharger shaft for rotation at very high speeds in the presence of very high turbocharger temperatures, comprising a turbocharger bearing housing including a cylindrical bearing surface, an outer bearing element having an outer cylindrical bearing surface adapted to be rotatably carried within the cylindrical bearing surface of the turbocharger bearing housing by a film of lubricant, said outer bearing element having two spaced inwardly projecting portions, each inwardly projecting portion of the outer bearing element having an inner cylindrical journal bearing surface for carrying a cylindrical turbocharger shaft portion by a film of lubricant and having an outer side thrust bearing surface positioned in-between said inner cylindrical journal bearing surface and said outer cylindrical bearing surface, said two spaced inwardly projecting portions forming with the turbocharger shaft a centrally located lubricant reservoir, said turbocharger shaft including a thrust bearing surface projecting radially therefrom to respective locations adjacent each said outer side thrust bearing surface of the inwardly projecting portions of the outer bearing element and adapted to transfer to the outer bearing element, thrust from the turbocharger shaft to the outer bearing element in the two opposing axial directions of the turbocharger shaft, said turbocharger shaft includes a shallow shoulder adjacent its turbine end and the thrust bearing surface at the turbine end of the turbocharger shaft is part of a separate element held against the shallow shoulder of the turbocharger shaft to reduce heat transfer from the turbine end of the turbocharger bearing system, said turbocharger bearing housing, outer bearing element and turbocharger shaft being adapted to provide a flow of lubricant from outside the turbocharger bearing housing to between the cylindrical bearing surface of the turbocharger bearing housing and the outer cylindrical bearing surface of the outer bearing element, and through the centrally located lubricant reservoir, and outwardly between the inner cylindrical journal bearing surfaces and the outer side thrust bearing surfaces of the inwardly projecting portions of the outer bearing surface, and between the cylindrical turbocharger shaft portions and thrust bearing surfaces of the turbocharger shaft adjacent each outer side thrust bearing surface of the outer bearing element to rotatably carry the turbocharger shaft and transfer thrust from the rotating turbocharger shaft to the outer bearing element in both axial directions of the turbocharger shaft.

10. The bearing system of claim 9 wherein the outer side thrust bearing surface of the inwardly projecting portion of the outer bearing element at the turbine end of the turbocharger includes at least one lubricant passageway.

11. The bearing system of claim 10 wherein a plurality of lubricant passageways extend radially from the inner cylindrical journal bearing surface and are uniformly spaced around the outer side thrust bearing surface.

12. A turbocharger bearing system for carrying a turbocharger shaft for rotation at very high speeds in the presence of very high turbocharger temperatures, comprising a turbocharger bearing housing including a cylindrical bearing surface, an outer bearing element having an outer cylindrical bearing surface adapted to be rotatably carried within the cylindrical bearing surface of the turbocharger bearing housing by a film of lubricant, said outer bearing element having two spaced inwardly projecting portions, each inwardly projecting portion of the outer bearing element having an inner cylindrical journal bearing surface for carrying a cylindrical turbocharger shaft portion by a film of lubricant and having an outer side thrust bearing surface positioned in-between said inner cylindrical journal bearing surface and said outer cylindrical bearing surface, said two spaced inwardly projecting portions forming with the turbocharger shaft a centrally located lubricant reservoir, said turbocharger shaft including a thrust bearing surface projecting radially therefrom to respective locations adjacent each said outer side thrust bearing surface of the inwardly projecting portions of the outer bearing element and adapted to transfer to the outer bearing element, thrust from the turbocharger shaft to the outer bearing element in the two opposing axial directions of the turbocharger shaft, said turbocharger bearing housing, outer bearing element and turbocharger shaft being adapted to provide a flow of lubricant from outside the turbocharger bearing housing to between the cylindrical bearing surface of the turbocharger bearing housing and the outer cylindrical bearing surface of the outer bearing element, and through the centrally located lubricant reservoir, and outwardly between the inner cylindrical journal bearing surfaces and the outer side thrust bearing surfaces of the inwardly projecting portions of the outer bearing surface, and between the cylindrical turbocharger shaft portions and thrust bearing surfaces of the turbocharger shaft adjacent each outer side thrust bearing surface of the outer bearing element to rotatably carry the turbocharger shaft and transfer thrust from the rotating turbocharger shaft to the outer bearing element in both axial directions of the turbocharger shaft, said turbocharger shaft includes a shallow shoulder adjacent its turbine end and includes an elongated sleeve with an outwardly projecting flange held against the shallow shoulder by a turbocharger end cap and lock nut at the compressor end of the turbocharger shaft to rotate with the turbocharger shaft, the outwardly projecting flange of the sleeve forming the turbocharger thrust bearing surface adjacent the outer side thrust bearing surface of the inwardly projecting portion of the outer bearing element at the turbine end of the turbocharger shaft and the turbocharger end cap forming the turbocharger thrust bearing surface adjacent the outer side thrust bearing surface of the inwardly projecting portion of the outer bearing surface at the compressor end of the turbocharger shaft.

13. A turbocharger bearing system for carrying a turbocharger shaft for rotation in the presence of high turbocharger temperatures, comprising a turbocharger bearing housing including an inner cylindrical bearing surface, an outer bearing element having an outer cylindrical bearing surface adapted to be rotatably carried within the cylindrical bearing surface of the turbocharger bearing housing by a film of lubricant, said outer bearing element having an inner cylindrical bearing surface for carrying a cylindrical turbocharger shaft portion by a film of lubricant and having outer side thrust bearing surfaces on each of its two opposite ends, said turbocharger shaft including a shallow shoulder at its turbine end, and having thrust bearing surfaces projecting radially from an engagement thereto, to respective positions adjacent each outer side thrust bearing surface on each of the opposite ends of the outer bearing element, said thrust bearing surfaces adapted to transfer thrust from the turbocharger shaft to the outer bearing element in the two opposing axial directions of the turbocharger shaft, said thrust bearing surface at the turbine end of the turbocharger shaft being formed on the inner side of a separate flange element seated against the shallow shoulder of the turbocharger shaft and extending outwardly adjacent the outer side thrust bearing surface at the turbine end of the outer bearing element, and said thrust bearing surface at the compressor end of the turbocharger shaft being formed on a separate end cap adjacent the outer side thrust bearing surface of the outer bearing element at the compressor end of the turbocharger shaft, said separate flange and end cap being held to and rotating with the turbocharger shaft, said turbocharger bearing housing, outer bearing element and turbocharger shaft being adapted to provide a flow of lubricant from outside the turbocharger bearing housing to between the cylindrical bearing surface of the turbocharger bearing housing and the outer cylindrical bearing surface of the outer bearing element, and through the outer bearing element, and outwardly between the inner cylindrical bearing surface of the outer bearing element and the cylindrical turbocharger shaft portion of the turbocharger shaft, and further between the outer side thrust bearing surfaces of the outer bearing element and thrust bearing surfaces of the turbocharger shaft adjacent each outer side thrust bearing surface of the outer bearing element, thereby reducing heat transfer from the turbine end of the turbocharger to the bearing surface while rotatably carrying the turbocharger shaft and transferring thrust from the rotating turbocharger shaft to the outer bearing element in both axial directions of the turbocharger shaft.

14. The bearing system of claim 13, wherein the separate flange element includes an elongated sleeve portion extending toward the compressor end of the turbocharger shaft and forming, with its outside surface, the cylindrical turbocharger shaft portion of the turbocharger shaft, and wherein a lock nut at the compressor end of the turbocharger shaft holds said separate end cap and separate flange element with its elongated sleeve against the shallow shoulder for rotation with the turbocharger shaft.

15. The bearing system of claim 13, wherein the outer side thrust bearing surface of the outer bearing element at the turbine end of the turbocharger end of the turbocharger shaft includes a plurality of lubricant passageways.

16. The bearing system of claim 15, wherein the plurality of lubricant passageways extend radially from the inner cylindrical bearing surface and are uniformly spaced around the outer side thrust bearing surface.

17. The bearing system of claim 15, wherein the plurality of lubricant passageways have shallow V-cross sections.

* * * * *